March 8, 1938.   J. H. MARTIN   2,110,382
MEANS FOR ATTACHING HOOKS TO FISHING LURES
Filed Sept. 5, 1935

INVENTOR
Joseph H. Martin
BY
Smith & Tuck
ATTORNEYS

Patented Mar. 8, 1938

2,110,382

UNITED STATES PATENT OFFICE 2,110,382

MEANS FOR ATTACHING HOOKS TO FISHING LURES

Joseph H. Martin, Seattle, Wash.

Application September 5, 1935, Serial No. 39,349

3 Claims. (Cl. 43—46)

My present invention relates to the art of fishing lures and more particularly to a means for attaching hooks to fishing lures.

In the past many types of fishing lures, as plugs and other multiple hook lures have been arranged with the hooks themselves secured to the body of the lure by a more or less fixed metal connection. In plugs, particularly, the hooks, usually treble or double hooks, were secured to the body of the lure by staples or screw eyes or, in some cases, eye bolts, in such a manner that the hooks could swing to a degree but could not be revolved upon their securing means. There are objections to this form of securing the hook to a lure inasmuch as the fish normally caught on lures are large, game fish, which tend to thrash about a great deal in their attempt to dislodge the hook from their mouth. In the case of larger fish, particularly salmon, having the hook fixedly secured to the plug even though it could pivot on the securing means, enables the fish to twist the hook against the lure in a manner to give him a decided mechanical advantage which resulted in a large number of fish either breaking the hook, breaking the securing means or tearing the hook out of his mouth. This condition is greatly aided when, after considerable use the securing means may become pitted with rust and thus weakened.

In my present securing means, I believe I have overcome, to a large degree at least, deficiencies of the former method of securing the hook to the lure. I accomplish this by providing that the hook, or plurality of hooks, be secured to the lure by means of a flexible member, such as for instance, a short length of linen twine, or fish line. With this arrangement I can space the hooks along the lure at the points decided upon and still make it possible for the fish in its struggle, to release all the hooks so that the hooks, aside from the one he is already engaged with, will all fall in the immediate vicinity of the hook contacted, and will in almost every instance help to further secure him. When so released from the friction securing means, the hooks are no longer directly in contact with the plug, thus giving the fish no opportunity of using the plug in a manner to assist him in freeing himself from the hooks.

The principal object of my present invention, therefore, is to provide a flexible securing means for attaching a hook, or plurality of hooks to a fish lure.

A further object of my invention is to provide means for frictionally holding the hooks in close proximity to the fishing lure yet to have this frictional means so arranged that as soon as the fish strikes, the hooks will be pulled away from close contact with the lure.

A still further object of my present invention is to provide means whereby if a fish becomes hooked on any one of the plurality of hooks employed the other free hooks will be in a position to engage him and hold him more securely.

Other and more specific objects will be apparent from the following description taken in connection with the accompanying drawing, wherein—

Figure 4 is a cross-sectional view taken along the line 4—4 of Figure 2.

Figure 1:
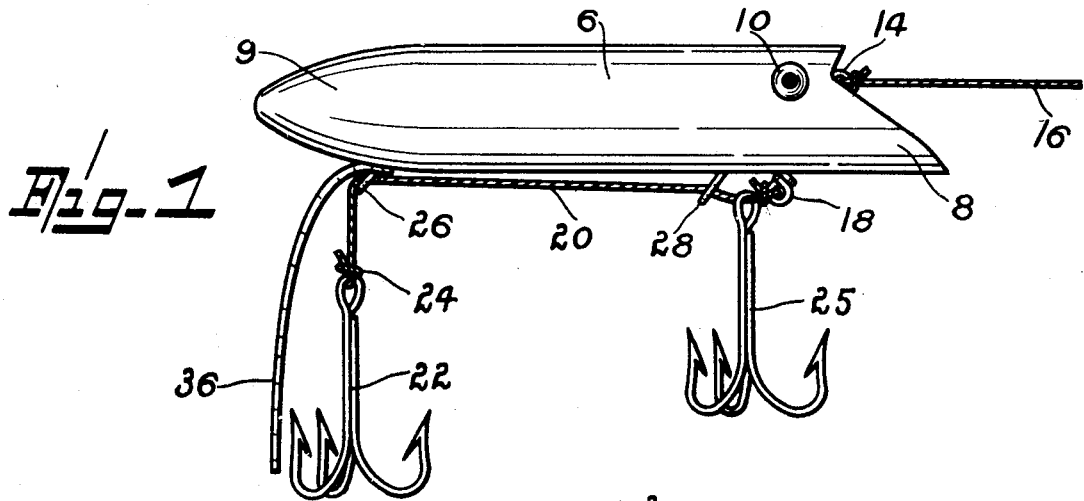
Figure 1 is a side elevation of a lure made after the teachings of my invention, showing the manner in which the hooks are secured thereto.
Figure 2:
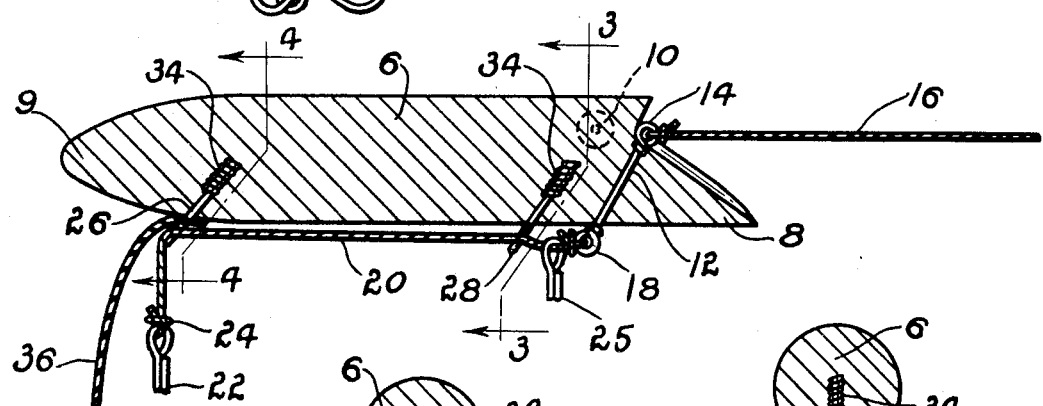
Figure 2 is a longitudinal, sectional view taken in the same plane as Figure 1.

Referring to the drawing, throughout which like reference characters indicate like parts, 6 designates a plug suitable for use with my hook-securing means. This is provided with a head end as 8 and a tail end 9, eyes as 10 are provided as is common with this type of lure. The exact form of lure forms no part of this present invention as it is believed the form of hook securing means may be used with many other styles of lures. Secured in the head end of the lure is a draft link 12. This is provided at its upper end with an eye 14 to which the trolling or casting line 16 is secured. At its lower end a second eye 18 is provided to which is secured, as by knotting thereto, a flexible hook securing means 20. Many types of material might be suitable for this line, a flexible braided wire, suitable chain, or preferably strong but flexible fishing twine, such as cuddyhunk.

Secured to the end of line 20 is the rear hook as 22. This hook may be of any desired type. It has been found, however, that the treble hook as shown in the drawing is probably the preferred form. The length of line 20 may be varied for different conditions, although I have found the proportions indicated in my drawing to be quite satisfactory. This gives substantially the same effect when the plug is towed through the water as though the rear hook 22 were secured to the extreme tail-end 9 of the lure. Disposed on line 20 between the point where the line is tied at 18 and the opposite end of the line where it is knotted at 24, may be any suitable number of additional hooks 25. In the drawing I have indicated one such hook, although if the length of the lure or the style of the lure were changed, it might be found desirable to have additional hooks 25.

Figure 3:
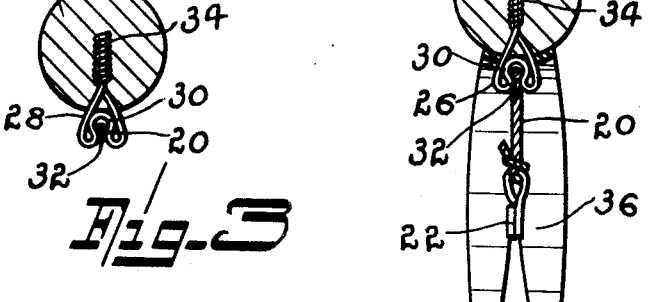
Figure 3 is a cross-sectional view taken along the line 3—3 of Figure 2.

The hooks are spaced and held in the desired position by a plurality of frictional line engaging means as 26 and 28. The exact construction of a preferred form of this device is shown in Figures 3 and 4 wherein a single piece of wire is bent back upon itself to form a line receiving ring 30 of a size somewhat larger than the line used so that the line will not be gripped but will be free to move slightly through the opening, thus preventing any local rusting, rotting the line.

The open mouth 32 of securing ring 30 should be slightly less in extent than the normal diameter of line 20, but of such an extent that when the line is compressed and pulled against the opening it will pass through the same. The two ends of the wire forming the friction clip are twisted together as at 34 so that they may be threaded into the body of the plug. Such threading assisted by water-proof glue or cement will hold the clip very securely in position. It is believed apparent that the exact form of clip shown can be varied considerably. The particular requirement being that the friction device will not put constant compression on the line so as to cause it to become weakened at the point of contact, and further that it will be certain to release the line when strain is placed upon the same. The particular form of lure shown has a flexible tail piece as 36 to increase its life-like appearance.

Method of operation.

In using my hook-securing means the lure is placed in the water with the line 20 secured within clips 26 and 28 and, possibly, other such clips if more were to be used, thus spacing the hooks and positioning them after the mode found most effective. The lure is then used as is common with the type of lure under consideration.

Figure 5:
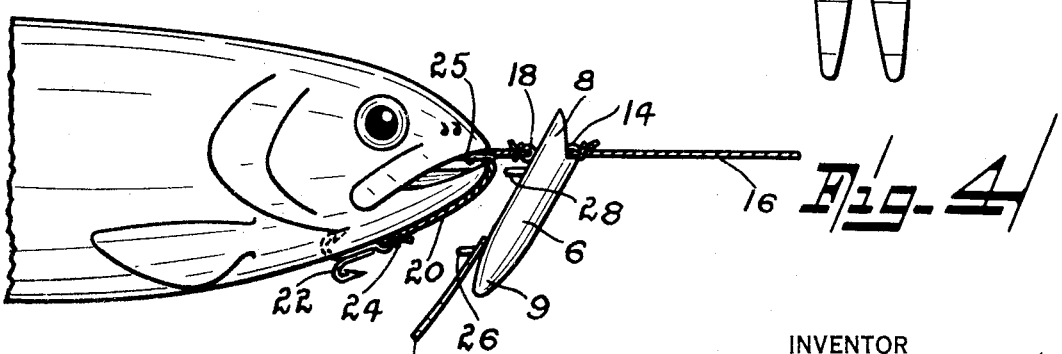
Figure 5 is a view showing a fish held by the hook which is struck and further secured by the second hook of a tandem arrangement.

Now it is well known that different fish of the same species will strike a lure from different positions, some from the head and some from the side and some will overtake the lure and grasp it from the tail. In Figure 5 I have illustrated the operation of my securing means assuming that the fish struck the head of the lure and was engaged on hook 25. The force of his striking being sufficient to pull line 20 out of engagement with clips 26 and 28. This frees hook 22 and if it is of the treble hook variety as indicated, it is almost certain to engage some part of the fish's head. Line 20 passing freely as it does through the eye of hook 25, then tends to pull the two hooks closely together and to thus assist the fisherman in the first place by keeping the hooks tightly embedded in the fish's head and mouth and, secondly, by giving two points of engagement as an added guarantee against loss of the fish, should one of the hooks become disengaged. If the fish were to grasp hook 22 he would similarly release hooks 25, which would be free to slide down on his head where, as a result of the fish's thrashing around, it would be certain to become embedded in some parts of his jaw and nose.

It will be clear it is believed, that all through the thrashing about incidental to the fish attempting to free himself, the lure itself is entirely out of harm's way and no amount of twisting of the hook will ever place the lure itself in the position of acting as a lever to assist in breaking the hook loose from the lure or disengaging it from the fish.

The foregoing description and the accompanying drawing are believed to clearly disclose a preferred embodiment of my invention but it will be understood that this disclosure is merely illustrative and that such changes in the invention may be made as are fairly within the scope and spirit of the following claims.

I claim:

1. The combination with a fish lure provided with a draft link and having a line attached at one end to said link and a hook attached to the free end of the line, of a supporting-eye secured to the lure for suspending the free portion of said line, and said eye having a mouth of less diameter than the line whereby the latter may be passed through the mouth by a pull on the line.

2. The combination with a fish-lure having a draft link, of a link having one end attached to said link and a hook on the free end of the line, a pair of spaced suspending rings rearward of said link and rigid with the lure and each having a mouth of less diameter than the line whereby the latter may be passed through said mouths by a pull on the line, and a second hook suspended on the line between the draft link and the adjacent ring.

3. The combination with a lure having a draft link, a fishing line attached to one end of the link, a hook-line attached to the other end of the link and a hook attached to the free end of said hook-line, of a pair of spaced suspending rings rigid with the lure and each having a mouth of less diameter than the hook-line whereby the latter may be freed from the rings by a pull on the hook-line, and a second hook suspended on a portion of the hook-line between its point of attachment and a suspending ring.

JOSEPH H. MARTIN.